US006590686B1

United States Patent
Sekiya et al.

(10) Patent No.: US 6,590,686 B1
(45) Date of Patent: Jul. 8, 2003

(54) OPTICAL TRANSMITTER

(75) Inventors: Motoyoshi Sekiya, Kawasaki (JP); Tetsuya Kiyonaga, Kawasaki (JP); Yoshitaka Shimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/353,313

(22) Filed: Jul. 14, 1999

(30) Foreign Application Priority Data

Dec. 24, 1998 (JP) .......................................... 10-367906

(51) Int. Cl.⁷ .............................................. H04B 10/04
(52) U.S. Cl. ...................................... 359/181; 359/180
(58) Field of Search ................................. 359/181, 182, 359/183, 184, 185, 186, 187, 180

(56) References Cited

U.S. PATENT DOCUMENTS

| 4,355,395 A | * | 10/1982 | Salter et al. | ................... 372/38 |
| 4,698,817 A | * | 10/1987 | Burley | ......................... 372/31 |
| 4,942,584 A | * | 7/1990 | Karaki et al. | ................... 372/29 |
| 5,896,201 A | * | 4/1999 | Fukushima | .................. 356/394 |
| 5,917,637 A | * | 6/1999 | Ishikawa et al. | ............ 359/181 |
| 6,233,082 B1 | * | 5/2001 | Johnson | ...................... 359/237 |

FOREIGN PATENT DOCUMENTS

| JP | 55-107285 | 8/1980 |
| JP | 3-46288 | 2/1991 |
| JP | 6-283797 | 10/1994 |
| JP | 7-202311 | 8/1995 |
| JP | 8-18145 | 1/1996 |

* cited by examiner

Primary Examiner—Brent A. Swarthout
(74) Attorney, Agent, or Firm—Staas & Halsey LLP

(57) ABSTRACT

Disclosed herein is an optical transmitter suitable for stabilization of the output power and wavelength of an optical signal. The optical transmitter includes a light source for outputting a light beam, an external modulator for modulating the light beam according to a main signal to thereby output an optical signal, a power monitor for detecting the power of the optical signal output from the external modulator, and a control unit for controlling the light source so that the power detected by the power monitor becomes stable. The light source is controlled according to the power detected on the downstream side of the external modulator, so that the output power of the optical signal to be obtained can be maintained constant with high accuracy irrespective of variations in loss by the external modulator.

14 Claims, 17 Drawing Sheets

FIG. 17A
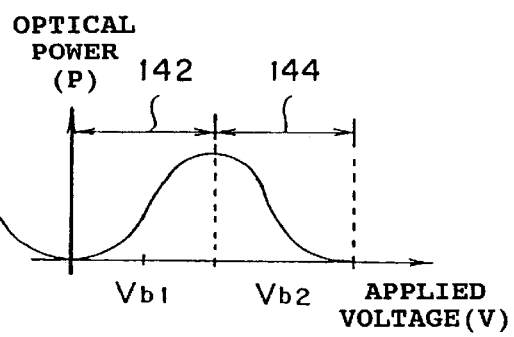
FIG. 17B
FIG. 17C
FIG. 17D
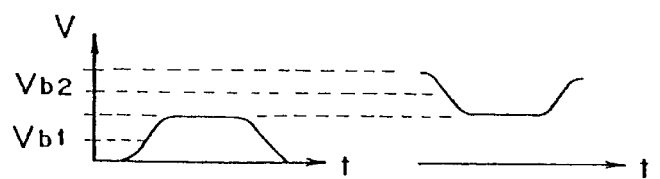
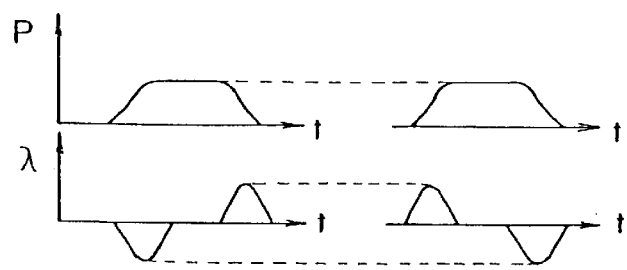
RED SHIFT  
α>0
BLUE SHIFT  
α<0

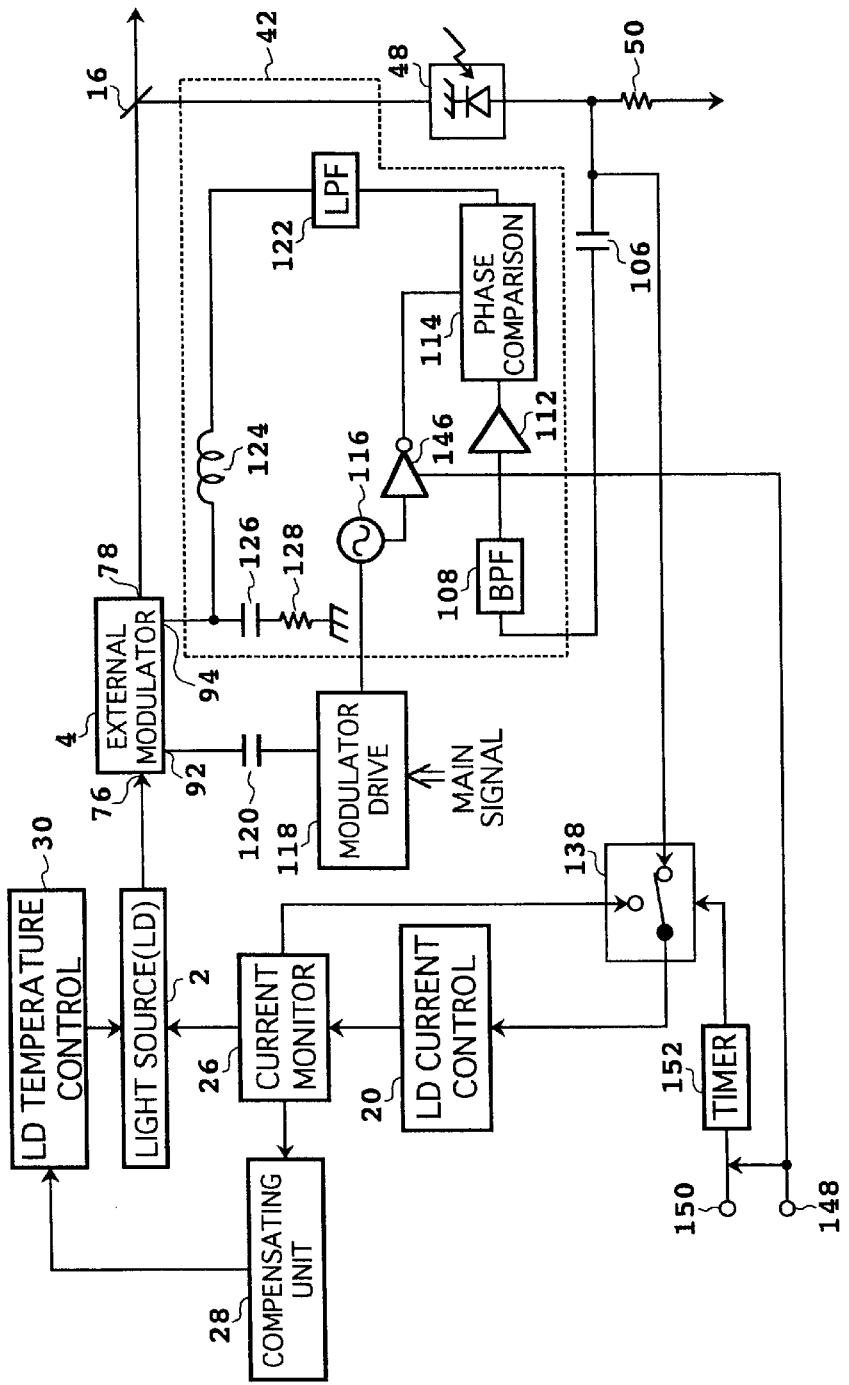

OPTICAL TRANSMITTER

BACKGROUND OF THE INVENTION

1. Field of the Invention

The present invention relates to an optical transmitter having an external modulator.

2. Description of the Related Art

In an optical fiber communication system, a modulation rate is increasing with an increase in capacity of the system. In direct intensity modulation of a laser diode, wavelength chirping is a problem. The chirping causes waveform distortion when an optical signal passes an optical fiber having chromatic dispersion. From a standpoint of fiber loss, the most desirable wavelength to be applied to a silica fiber is 1.55 μm. At this wavelength, a normal fiber has a chromatic dispersion of about 18 ps/km/nm, which limits a transmission distance. To avoid this problem, an external modulator has increasingly been expected.

As a practical external modulator, a Madh-Zehnder type optical modulator (LN modulator) using $LiNbO_3$ (lithium niobate) as a substrate material has been developed. Continuous-wave light (CW light) having a constant intensity from a light source is supplied to the LN modulator, in which a switching operation using interference of light is carried out to obtain an intensity-modulated optical signal.

The LN modulator has a frequently pointed-out defect that it causes operation point drift. To cope with the operation point drift, light output from the LN modulator is monitored, and control for operation point stabilization is carried out according to an electrical signal obtained as the result of this monitoring.

FIG. 1 is a block diagram showing an optical transmitter in the related art. This optical transmitter includes a laser diode (LD) 2 as a light source for outputting a light beam as CW light, and an external modulator 4 for modulating the light beam output from the laser diode 2 according to a main signal to thereby output an optical signal. A drive current for the laser diode 2 is maintained constant by an LD current control circuit 6, so as to maintain constant the power of the light beam to be output from the laser diode 2. Further, to maintain constant the wavelength of the light beam to be output from the laser diode 2, a temperature sensor such as a thermistor (not shown) is provided in the vicinity of the laser diode 2, and an LD temperature control circuit 8 is provided to perform feedback control such that the temperature detected by the temperature sensor becomes constant.

Throughout the drawings, the thick solid line arrows represent the flow of electrical signals, and the thin solid line arrows represent the flow of optical signals or light beams.

In the conventional optical transmitter shown in FIG. 1, the drive current for the laser diode 2 is maintained constant by the LD current control circuit 6. Accordingly, when the characteristics of the laser diode 2 vary because of aging or the like of the laser diode 2, there is a possibility that the power of the light beam to be output from the laser diode 2 may vary. Another conventional optical transmitter improved in this respect will be described with reference to FIG. 2.

FIG. 2 is a block diagram showing such an improved optical transmitter in the related art. An optical output fixing control or automatic power control (APC) circuit 10 is provided to perform feedback control of the power of a light beam to be output from a laser diode 2. The laser diode 2 outputs a forward beam and a backward beam. The forward beam is supplied to an external modulator 4, and the backward beam is supplied to a back power monitor 12. An LD current control circuit 14 controls a drive current to be supplied to the laser diode 2 so that the power of the backward beam detected by the back power monitor 12 becomes constant. The power of the forward beam is proportional to the power of the backward beam. Accordingly, such feedback control enables the power of the forward beam to be maintained constant.

However, the improved optical transmitter in the related art shown in FIG. 2 yet has a problem such that it is difficult to maintain the output power of an optical signal to be obtained constant with high accuracy. Although the power of the light beam to be output from the laser diode 2 is maintained constant by the feedback control as mentioned above, there is a possibility of variations in loss by the external modulator 4 due to changes in outside environments such as temperature, resulting in variations in the power of an optical signal to be output from the external modulator 4.

SUMMARY OF THE INVENTION

It is therefore an object of the present invention to provide an optical transmitter having an external modulator wherein the output power of an optical signal to be output from the optical transmitter can be maintained constant with high accuracy.

It is another object of the present invention to provide an optical transmitter having an external modulator wherein the output power and wavelength of an optical signal to be output from the optical transmitter can be maintained constant with high accuracy.

In accordance with an aspect of the present invention, there is provided an optical transmitter comprising a light source for outputting a light beam; an external modulator for modulating the light beam output from the light source according to a main signal to output an optical signal; a power monitor for detecting the power of the optical signal output from the external modulator; and a first control unit for controlling the light source so that the power detected by the power monitor becomes constant.

With this configuration, the power of the optical signal output from the external modulator is detected, and the light source is controlled so that the power detected becomes constant. Accordingly, the power of the optical signal to be output from this optical transmitter can be maintained constant with high accuracy irrespective of variations in loss by the external modulator, thus achieving one of the objects of the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 17A to 17D are graphs for illustrating switching of a chirp parameter; and FIG. 18 is a block diagram showing a ninth preferred embodiment of the optical transmitter according to the present invention.

DETAILED DESCRIPTION OF THE PREFERRED EMBODIMENTS

Some preferred embodiments of the present invention will now be described in detail.

Figure 1:
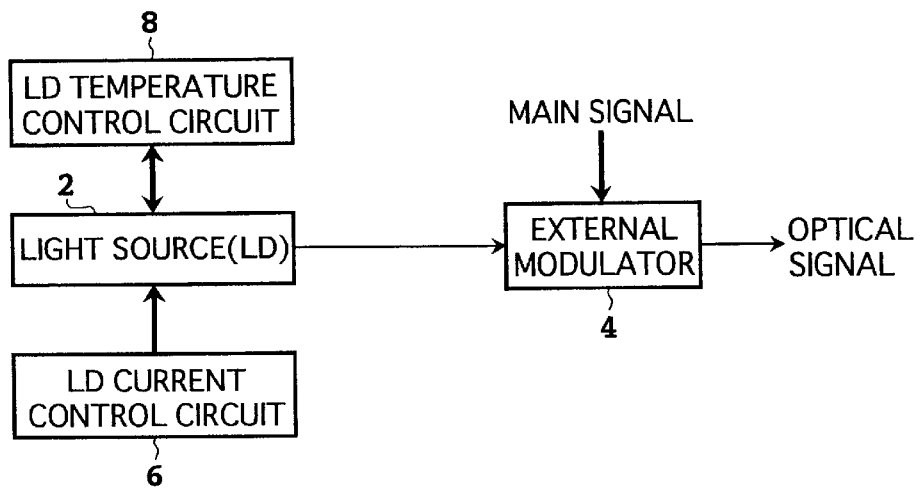
FIG. 1 is a block diagram showing an optical transmitter in the related art.
Figure 2:
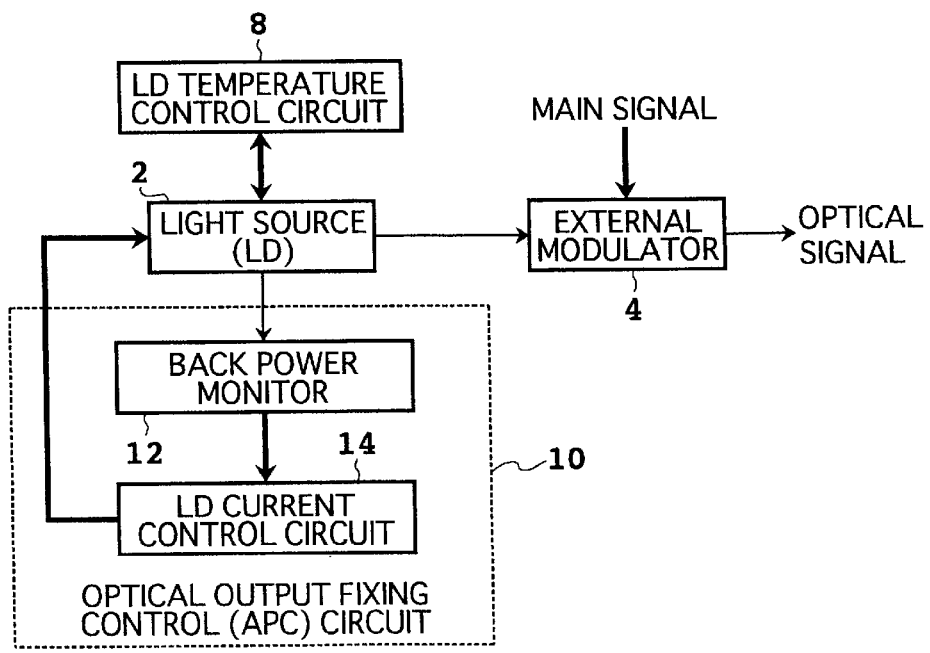
FIG. 2 is a block diagram showing another optical transmitter in the related art.
Figure 3:
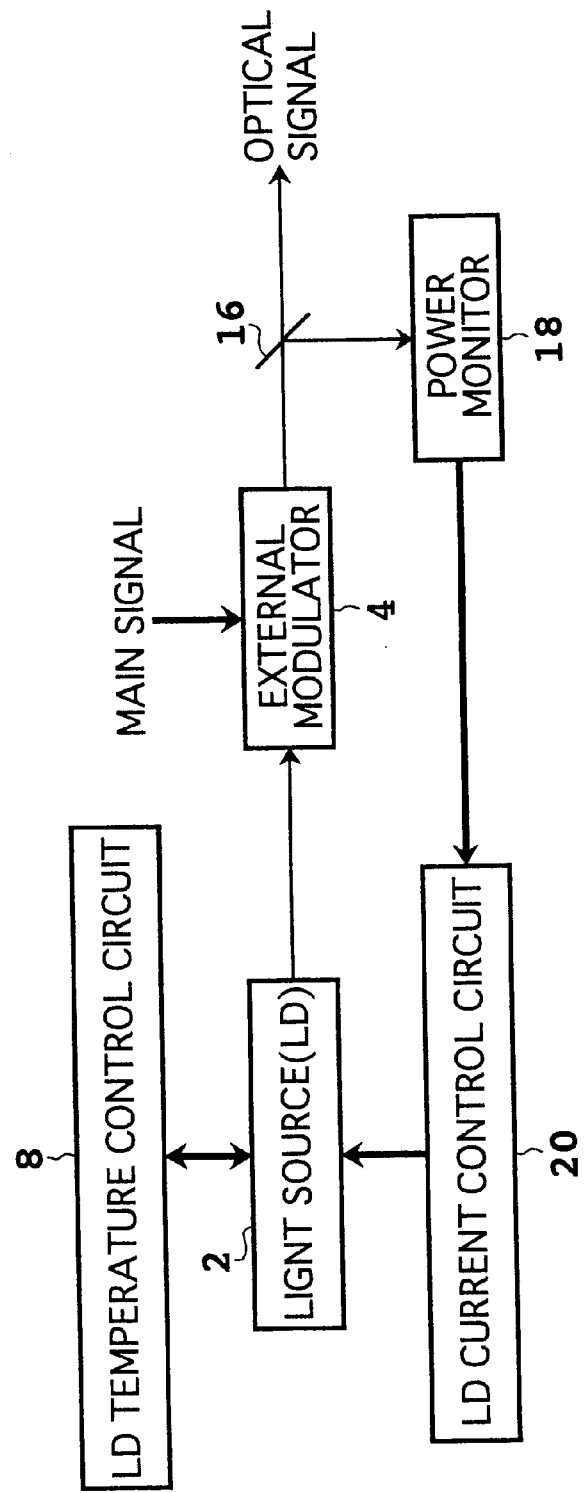
FIG. 3 is a block diagram showing a first preferred embodiment of the optical transmitter according to the present invention.

FIG. 3 is a block diagram showing a first preferred embodiment of the optical transmitter according to the present invention. This optical transmitter includes a laser diode (LD) 2 as a light source for outputting a light beam, and an external modulator 4 for receiving the light beam output from the laser diode 2. The external modulator 4 modulates the light beam received according to a main signal supplied from a drive circuit (not shown) to generate an optical signal and output this optical signal. Examples of the external modulator 4 usable in the present invention include a Mach-Zehnder type optical modulator to be hereinafter described, an electroabsorption type optical modulator, and other types optical modulators.

The optical signal generated in the external modulator 4 is passed through a beam splitter 16 such as an optical coupler and output from this optical transmitter. In the beam splitter 16, a part of the optical signal is extracted as a monitor beam, which is in turn supplied to a power monitor 18. The power monitor 18 detects the power of the optical signal to be output from this optical transmitter, according to the monitor beam supplied.

The present invention employs a first control unit for controlling the laser diode 2 so that the power detected by the power monitor 18 becomes constant. In this preferred embodiment, the first control unit is provided by an LD current control circuit 20. The control circuit 20 supplies to the laser diode 2 a drive current controlled so that the power detected by the power monitor 18 becomes constant.

In this preferred embodiment, an LD temperature control circuit 8 is further provided to maintain the temperature of the laser diode 2 constant. The control circuit 8 receives a signal from a temperature sensor such as a thermistor (not shown) provided in the vicinity of the laser diode 2, and controls a drive current for a Peltier element (not shown), for example, provided in the vicinity of the laser diode 2 so that the temperature of the laser diode 2 is maintained constant.

In this preferred embodiment, the power of the optical signal is detected on the downstream side of the external modulator 4, and the drive current for the laser diode 2 is controlled according to the result of this detection. Accordingly, the output power of the optical signal to be output from this optical transmitter can be maintained constant with high accuracy irrespective of variations in loss by the external modulator 4. Furthermore, the temperature of the laser diode 2 is maintained constant by the LD temperature control circuit 8, so that the wavelength of the optical signal to be output from this optical transmitter can be maintained constant.

In the first preferred embodiment shown in FIG. 3, the oscillation wavelength of the laser diode 2 is maintained constant under steady operating conditions, because the temperature of the laser diode 2 is maintained constant. However, there is a possibility that the oscillation wavelength of the laser diode 2 may change with a change in the drive current for the laser diode 2, because the drive current is controlled by the LD current control circuit 20. Particularly in the case that the optical transmitter is applied to a wavelength division multiplexing (WDM) system, high-precision stabilization of the oscillation wavelength of the light source is required, so as to prevent interchannel crosstalk. A preferred embodiment for meeting such a requirement will now be described with reference to FIG. 4.

Figure 4:
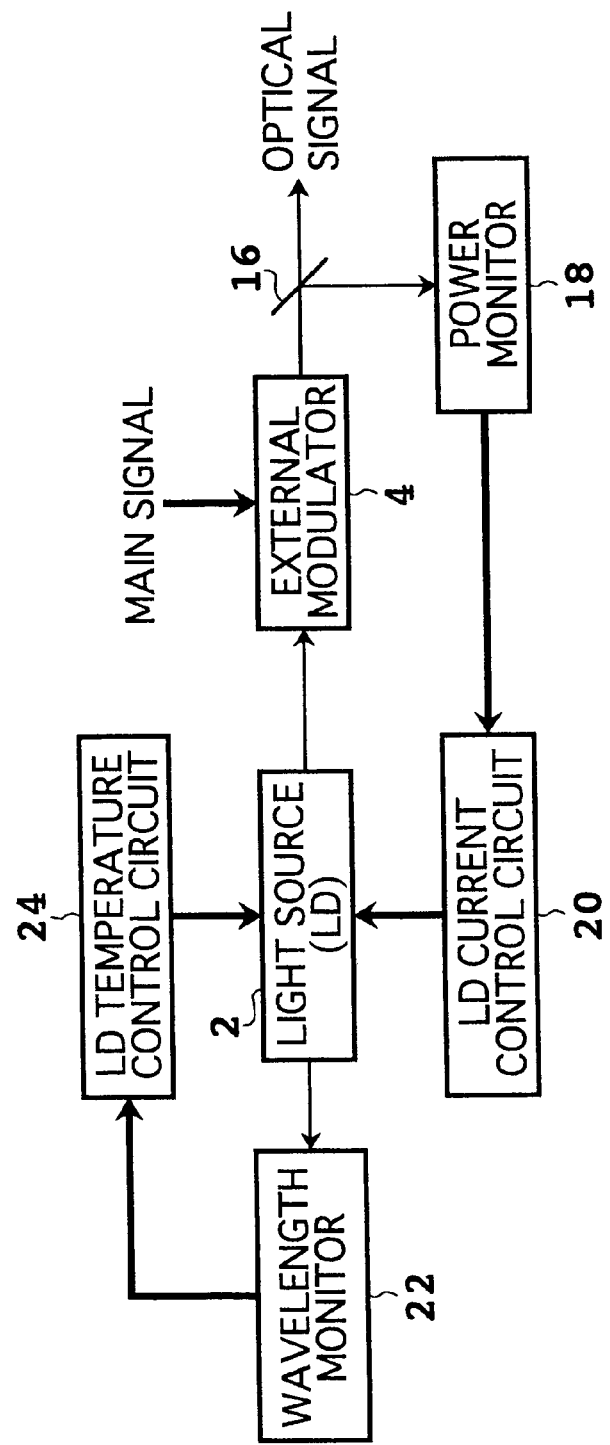
FIG. 4 is a block diagram showing a second preferred embodiment of the optical transmitter according to the present invention.

FIG. 4 is a block diagram showing a second preferred embodiment of the optical transmitter according to the present invention. In this preferred embodiment, a wavelength monitor 22 and an LD temperature control circuit 24 for maintaining the oscillation wavelength of the laser diode 2 constant is adopted in place of the control circuit 8 (see FIG. 3) for maintaining the temperature of the laser diode 2.

The laser diode 2 outputs a forward beam and a backward beam. The forward beam is supplied to an external modulator 4, and the backward beam is supplied to the wavelength monitor 22. With this configuration, the wavelength monitor 22 can detect the oscillation wavelength of the laser diode 2, because the wavelength of the forward beam and the wavelength of the backward beam are equal to each other. The LD temperature control circuit 24 controls the temperature of the laser diode 2 so that the wavelength detected by the wavelength monitor 22 is maintained constant.

According to this preferred embodiment, the oscillation wavelength of the laser diode 2 can be stabilized with higher accuracy as compared with the first preferred embodiment shown in FIG. 3, so that the power and wavelength of an optical signal to be output from this optical transmitter can be maintained constant with higher accuracy.

Figure 5A:
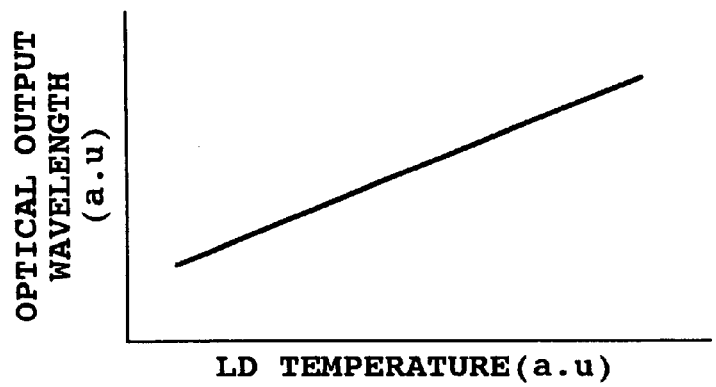
FIGS. 5A and 5B are graphs showing characteristics of a general laser diode.
Figure 5B:
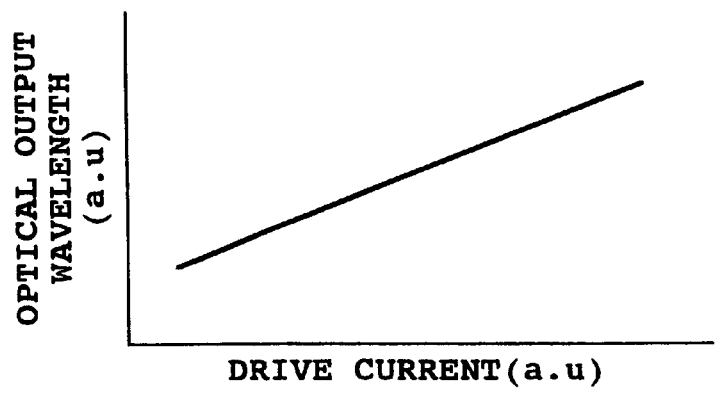

Referring to FIGS. 5A and 5B, there are shown characteristics of a general laser diode. FIG. 5A shows a relation between optical output wavelength (in arbitrary unit) and LD temperature (in arbitrary unit). As apparent from FIG. 5A, the optical output wavelength increases with an increase in the LD temperature. FIG. 5B shows a relation between optical output wavelength (in arbitrary unit) and drive current (in arbitrary unit). As apparent from FIG. 5B, the optical output wavelength increases with an increase in the drive current.

Accordingly, by preliminarily grasping the relations shown in FIGS. 5A and 5B with respect to a laser diode given, wavelength changes due to changes in the drive current can be compensated by changing the LD temperature. Such compensation will now be described more specifically.

Figure 6:
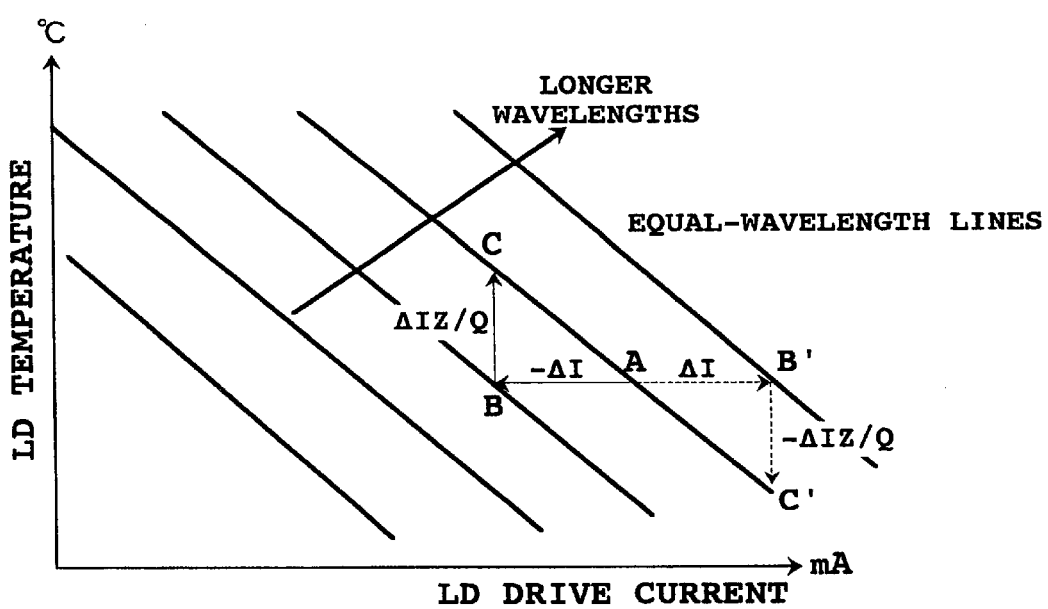
FIG. 6 is a graph showing an example of compensation for wavelength changes.

FIG. 6 is a graph showing an example of the compensation for wavelength changes (changes in the oscillation wavelength of a laser diode). In FIG. 6, the vertical axis represents the temperature (°C.) of a laser diode, and the horizontal axis represents the drive current (mA) for the laser diode. The five straight lines extending downward to the right shown in FIG. 6 represent typical equal-wavelength lines.

It is assumed that the laser diode is being driven at a point A and that the drive current for the laser diode is now changed by $-\Delta I$ (mA) to shift the point A to a point B in order to maintain the output power of the laser diode constant. Letting Z (nm/mA) denote the current coefficient of wavelength (the slope of the graph shown in FIG. 5B), the wavelength change at this time is given by $-\Delta IZ$ (nm). Accordingly, letting Q (nm/°C.) denote the temperature coefficient of wavelength (the slope of the graph shown in FIG. 5A), the same wavelength as the wavelength at the point A can be obtained by increasing the temperature of the laser diode by $\Delta IZ/Q$ (°C.) to shift the point B to a point C. Thus, the compensation for the wavelength change $-\Delta IZ$ (nm) can be effected.

Conversely, when the drive current for the laser diode is increased by $\Delta I$ (mA) to shift the point A to a point B', the temperature of the laser diode is decreased by $\Delta IZ/Q$ (°C.) to shift the point B' to a point C', thus similarly effecting the compensation for the wavelength change $\Delta Iz$ (nm).

There will now be described some preferred embodiments capable of effecting the wavelength compensation based on the principle mentioned above with reference to FIG. 6.

Figure 7:
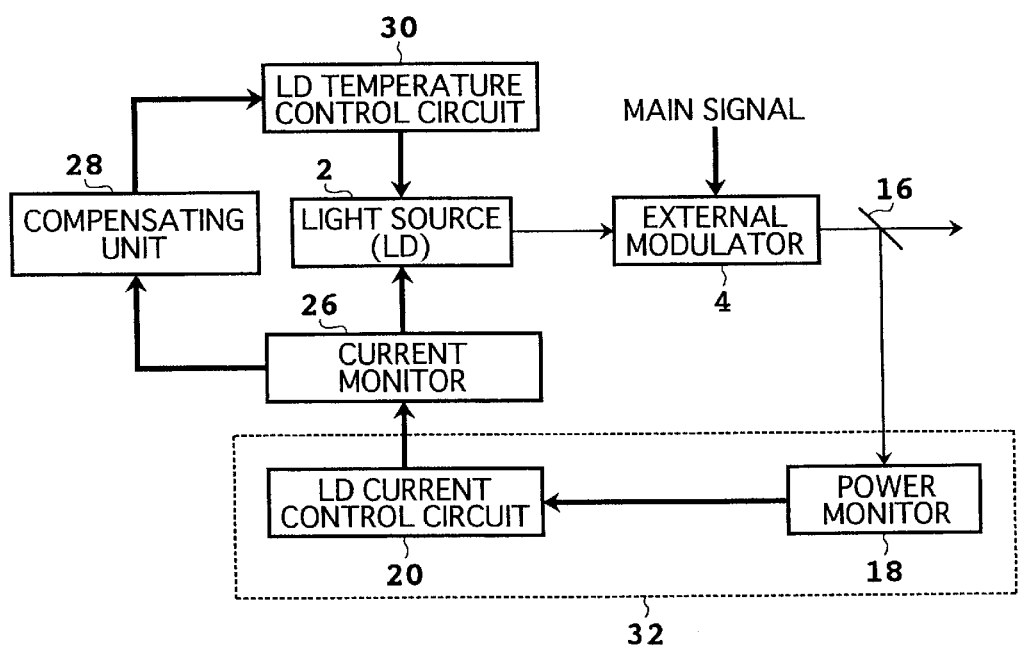
FIG. 7 is a block diagram showing a third preferred embodiment of the optical transmitter according to the present invention.

FIG. 7 is a block diagram showing a third preferred embodiment of the optical transmitter according to the present invention. A current monitor 26 is provided between the LD current control circuit 20 and the laser diode 2. The current monitor 26 detects a drive current to be supplied from the control circuit 20 to the laser diode 2. A compensating unit 28 is provided to change the temperature of the laser diode 2 according to a change in the drive current detected by the current monitor 26 so that the wavelength of the light beam to be output from the laser diode 2 becomes constant. More specifically, an LD temperature control circuit 30 changes the temperature of the laser diode 2 according to an output signal from the compensating unit 28.

In accordance with the principle described with reference to FIG. 6, the compensating unit 28 linearly decreases the temperature of the laser diode 2 with an increase in the drive current for the laser diode 2, thereby compensating for a wavelength change due to a change in the drive current.

The power monitor 18 and the LD current control circuit 20 constitute a circuit 32 for controlling the optical output power to a constant value (APC).

Figure 8:
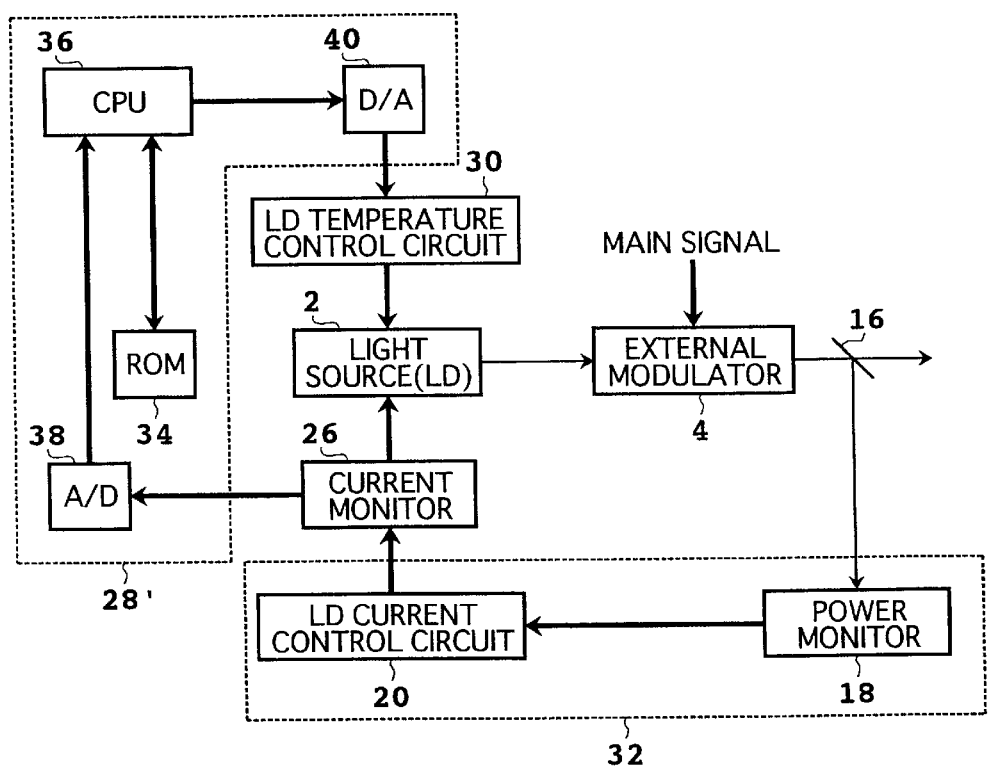
FIG. 8 is a block diagram showing a fourth preferred embodiment of the optical transmitter according to the present invention.

FIG. 8 is a block diagram showing a fourth preferred embodiment of the optical transmitter according to the present invention. In contrast with the third preferred embodiment shown in FIG. 7 wherein the compensating unit 28 performs analog control, the fourth preferred embodiment shown in FIG. 8 employs a compensating unit 28' modified so as to be adapted to digital signal processing.

The compensating unit 28' includes storage means (read-only memory (ROM) 34) for storing a wavelength change corresponding to a change in the drive current detected by the current monitor 26, and means (CPU 36) for calculating a temperature change of the laser diode 2 required to compensate for the wavelength change according to the content stored in the storage means. A monitor output from the current monitor 26 is input through an A/D (analog/digital) converter 38 into the CPU 36, and the result of calculation by the CPU 36 is supplied through a D/A (digital/analog) converter 40 to the LD temperature control circuit 30.

According to the third or fourth preferred embodiment, the output power and wavelength of an optical signal to be obtained can be maintained constant with high accuracy without the need for actual measurement of the wavelength of the light beam output from the laser diode 2.

Figure 9:
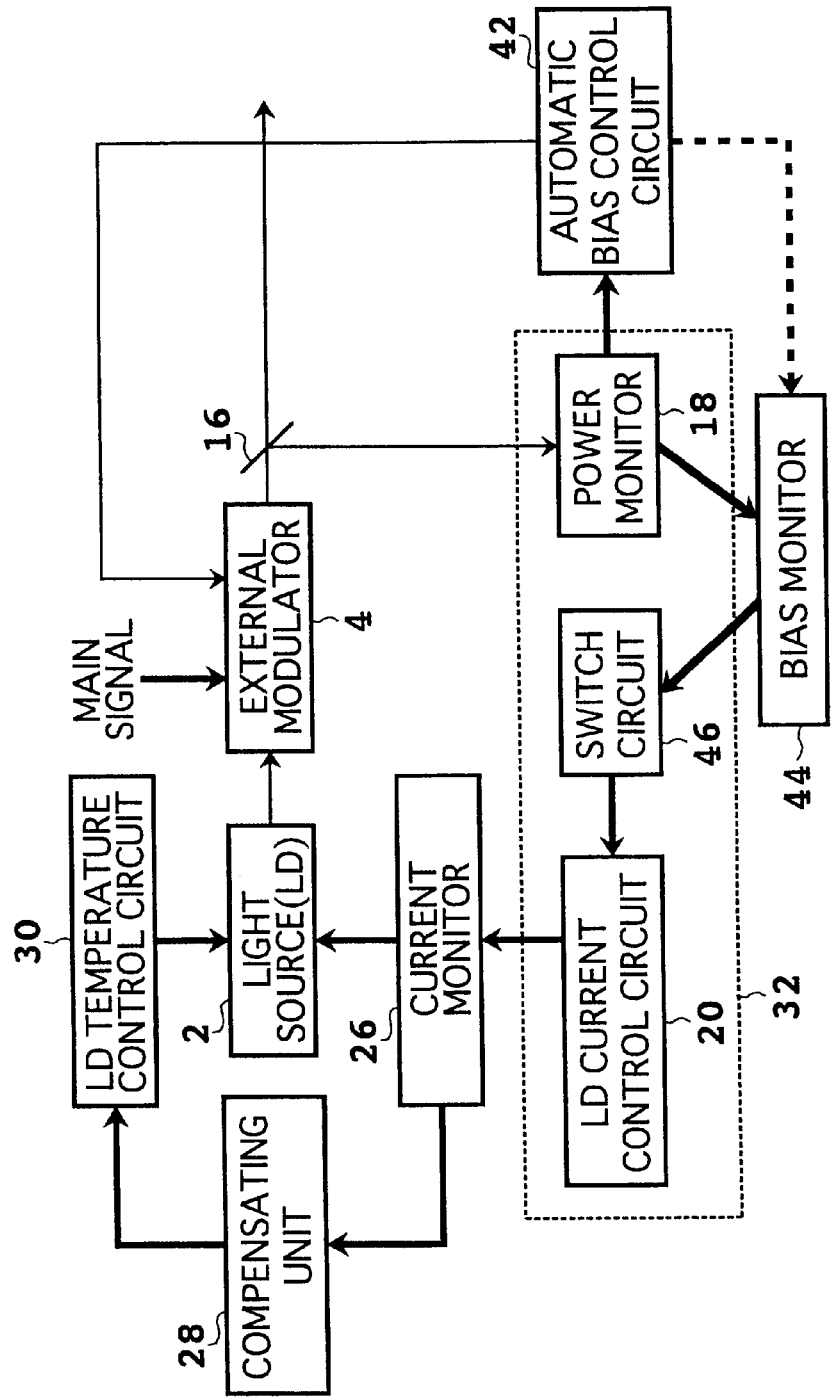
FIG. 9 is a block diagram showing a fifth preferred embodiment of the optical transmitter according to the present invention.

FIG. 9 is a block diagram showing a fifth preferred embodiment of the optical transmitter according to the present invention. In contrast with the third preferred embodiment shown in FIG. 7, the fifth preferred embodiment is characterized in that the external modulator 4 is provided by a modulator such as a Mach-Zehnder type optical modulator designed to receive a bias voltage for determining an operation point. An automatic bias control circuit 42 is connected to the power monitor 18 included in the circuit 32 for APC. The control circuit 42 controls a bias voltage to be supplied to the external modulator 4 so that the operation point of the external modulator 4 is stabilized.

For example, the automatic bias control circuit 42 may be composed of means for superimposing a low-frequency signal on a main signal supplied to the external modulator 4 and means for controlling the bias voltage so that a low-frequency component included in an optical signal to be output from the external modulator 4 decreases.

In such a case that the low-frequency signal is superimposed on the main signal, the power of an optical signal to be output from this optical transmitter varies according to the low-frequency signal. Accordingly, if the LD current control circuit 20 and the automatic bias control circuit 42 are operated at the same time, there is a possibility of contention between the control by the control circuit 20 and the control by the control circuit 42 to cause undesirable variations in the output power of the optical signal. It is therefore preferable to stop the operation of the LD current control circuit 20 until the bias voltage applied to the external modulator 4 becomes stable.

In this respect, the fifth preferred embodiment shown in FIG. 9 employs a bias monitor 44 and a switch circuit 46. The bias monitor 44 detects whether or not the bias voltage applied to the external modulator 4 has become constant according to an output signal from the power monitor 18 or an output signal from the automatic bias control circuit 42. The switch circuit 46 switches on or off the operation of the LD current control circuit 20 according to the result of the detection by the bias monitor 44. That is, the operation of the LD current control circuit 20 is kept off by the switch circuit 46 until the bias voltage becomes stable. When the bias voltage becomes stable, the switch circuit 46 switches on the operation of the LD current control circuit 20. Accordingly, contention between the control by the automatic bias control circuit 42 and the control by the LD current control circuit 20 can be prevented to thereby eliminate the possibility of undesirable variations in the output power of the optical signal.

The bias monitor 44 may be connected either to the automatic bias control circuit 42 or to the power monitor 18. In the former case, the bias monitor 44 can directly measure the bias voltage to thereby detect stabilization of the bias voltage. In the latter case, the bias monitor 44 can detect stabilization of the bias voltage according to the amplitude of a low-frequency component corresponding to the low-frequency signal mentioned above. The latter case will be hereinafter described in conjunction with a specific circuit configuration of the automatic bias control circuit 42. The operation of the former case will now be described with reference to FIGS. 10A and 10B.

Figure 10:
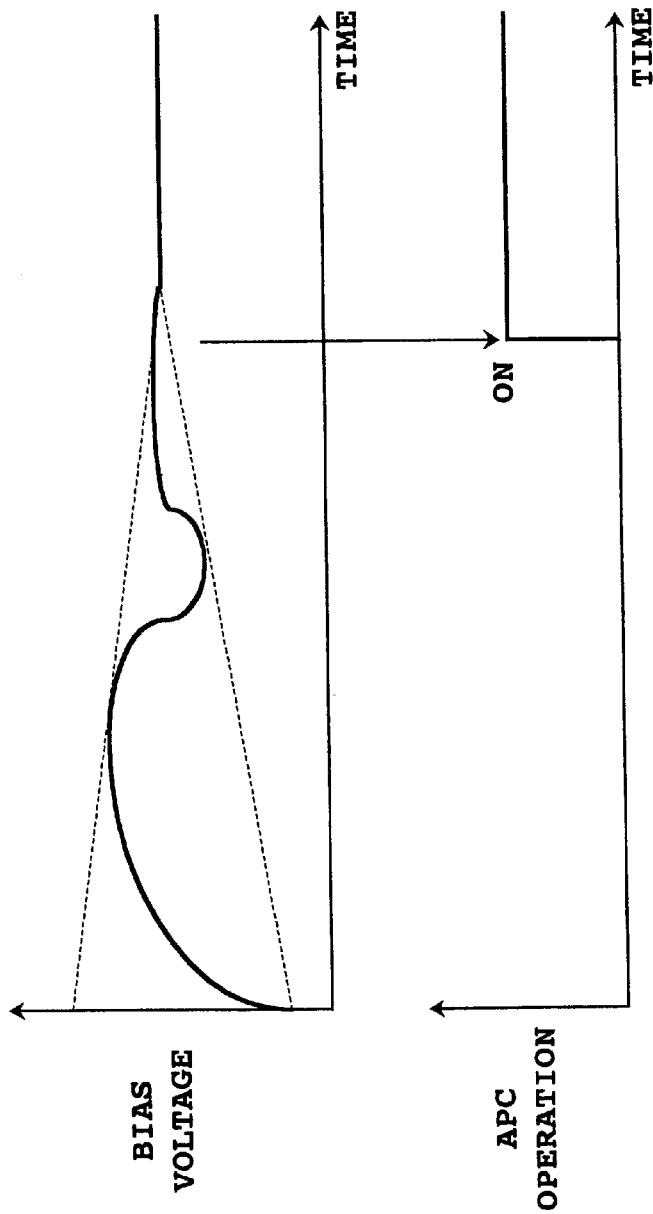
FIG. 10 is a time chart for illustrating the operation of a switch circuit 46 shown in FIG. 9.

FIG. 10 is a time chart for illustrating the operation of the switch circuit 46 shown in FIG. 9. The bias voltage is controlled by the automatic bias control circuit 42 so as to be converged to a constant value. Such stabilization of the bias voltage is detected by the bias monitor 44. When the bias voltage becomes stable, the operation of the LD current control circuit 20 is switched on by the switch circuit 46 to start APC. At the time the bias voltage is stabilized, the output from the external modulator 4 is stabilized. Accordingly, by starting the operation of APC at this time, an unstable operation due to contention between the control by the control circuit 42 and the control by the control circuit 20 can be prevented.

Although not shown, stopping the operation of the LD current control circuit 20 until the bias voltage for the external modulator 4 becomes stable may be effected by providing a switch for switching between the LD current control circuit 20 and the automatic bias control circuit 42, and a timer connected to the switch for setting an approximate period of time until stabilization of the bias voltage.

Figure 11:
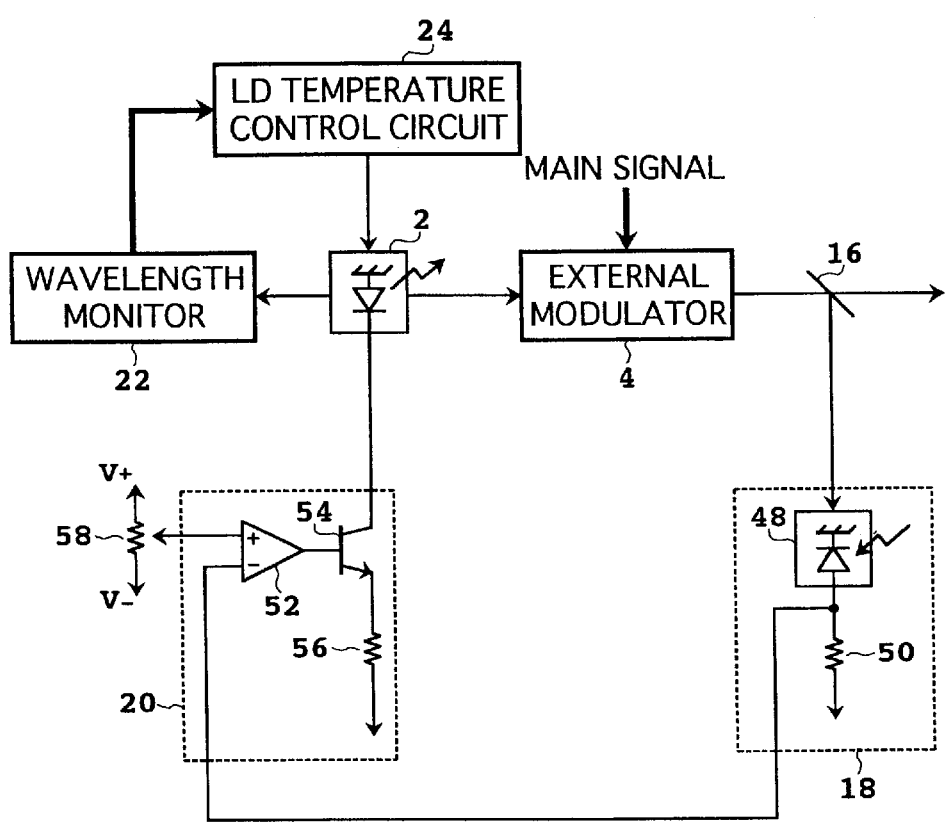
FIG. 11 is a block diagram showing a sixth preferred embodiment of the optical transmitter according to the present invention.

FIG. 11 is a block diagram showing a sixth preferred embodiment of the optical transmitter according to the present invention. This preferred embodiment corresponds to the second preferred embodiment shown in FIG. 4, and specific circuit configurations of the power monitor 18 and the LD current control circuit 20 are shown.

The power monitor 18 includes a photodiode 48 for receiving a part of an optical signal output from the external modulator 4, and a resistor 50 for converting a photocurrent flowing in the photodiode 48 into a voltage signal.

The LD current control circuit 20 includes an operational amplifier 52 for comparing the voltage signal supplied from the power monitor 18 and a reference voltage supplied from a voltage source 58 to output an error signal between the voltage signal and the reference voltage, and a transistor 54 for receiving the error signal from the operational amplifier 52 as a control input to supply a drive current to the laser diode 2. The voltage signal from the power monitor 18 is supplied to the minus input port of the operational amplifier 52, and the reference voltage from the voltage source 58 is supplied to the plus input port of the operational amplifier 52. The output port of the operational amplifier 52 is connected to the base of the transistor 54. The anode of the laser diode 2 is grounded, and the cathode of the laser diode 2 is connected to the collector of the transistor 54. The emitter of the transistor 54 is connected through a resistor 56 to a minus power supply.

With this configuration, the drive current to be supplied to the laser diode 2 is feedback controlled according to an average power of the optical signal output from the external modulator 4. Accordingly, the output power of the optical signal to be output from this optical transmitter can be maintained constant with high accuracy irrespective of variations in loss by the external modulator 4.

Figure 12:
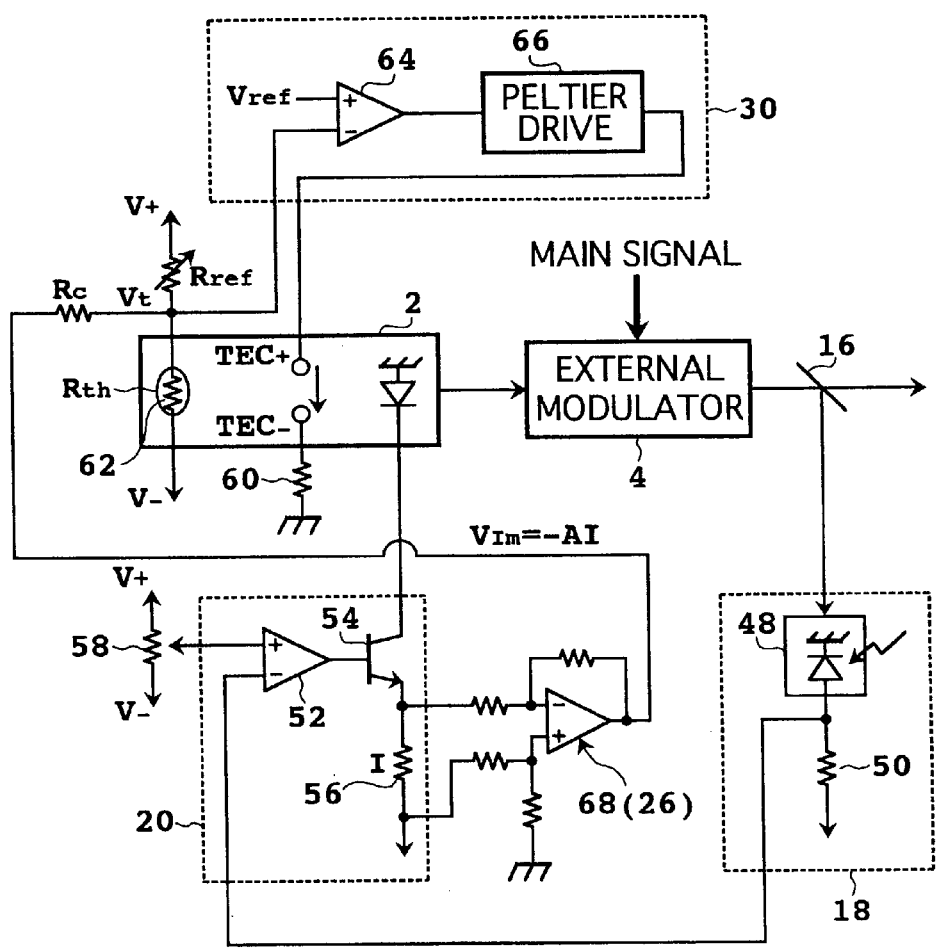
FIG. 12 is a block diagram showing a seventh preferred embodiment of the optical transmitter according to the present invention.

FIG. 12 is a block diagram showing a seventh preferred embodiment of the optical transmitter according to the present invention. In this preferred embodiment, a specific configuration of the third preferred embodiment shown in FIG. 7 is shown. Specific circuit configurations of the power monitor 18 and the LD current control circuit 20 shown in FIG. 12 are similar to those shown in FIG. 11.

A Peltier element (not shown) for adjusting the temperature of the laser diode 2 by cooling is provided in the vicinity of the element of the laser diode 2, and a pair of terminals (TEC+) and (TEC−) for passing a current through the Peltier element are provided. A thermistor 62 having a resistance $R_{th}$ varying according to temperature is provided in the vicinity of the chip of the laser diode 2. One end of the thermistor 62 is connected to a minus power supply $V_-$, and the other end of the thermistor 62 is connected through a reference resistance $R_{ref}$ to a plus power supply $V_+$. The temperature of the thermistor 62 is reflected by a potential $V_t$ at a connection point between the thermistor 62 and the reference resistance $R_{ref}$.

The LD temperature control circuit 30 includes an operational amplifier 64 and a Peltier drive circuit 66. A reference voltage $V_{ref}$ is input to the plus input port of the operational amplifier 64, and the above-mentioned voltage $V_t$ is input to the minus input port of the operational amplifier 64. The Peltier drive circuit 66 passes a current through the Peltier element so that the voltage $V_t$ becomes equal to the reference voltage $V_{ref}$. That is, the Peltier drive circuit 66 is connected to the terminal (TEC+), and the terminal (TEC−) is grounded through a resistor 60.

To compensate for a wavelength change by changing the temperature of the laser diode 2 according to a change in the drive current for the laser diode 2, a voltage drop in the resistor 56 is detected by an inverting amplifier 68 (the current monitor 26). That is, a drive current I for the laser diode 2 passing through the resistor 56 is converted into a voltage signal $V_{Im}$ by the inverting amplifier 68. Letting A denote a constant, $V_{Im}=-AI$. The voltage signal $V_{Im}$ is supplied through a resistance $R_c$ to the connection point between the thermistor 62 and the reference resistance $R_{ref}$. At this time, the following equation holds.

$$(V_t-V_-)/R_{th}+(V_t-V_{Im})/R_c=(V_+-V_t)/R_{ref}$$

Letting $\Delta R_{th}$, $\Delta V_{Im}$, and $\Delta I$ denote changes in $R_{th}$, $V_{Im}$, and I, respectively, the following equation is given.

$$\Delta R_{th}=-(R_{th}^2/C)\,\Delta V_{Im}=(R_{th}^2/C)A\Delta I$$

where C is a constant.

The current change $\Delta I$ can be converted into a wavelength change $\Delta\lambda_1$ expressed by $\Delta\lambda_1=Z\Delta I$.

The wavelength $\lambda$ decreases with an increase in $R_{th}$, and this relation is approximated by a linear expression with its slope denoted by $-Y$ (nm/Ω) to obtain a wavelength correction amount $\Delta\lambda_2$ expressed as follows:

$$\Delta\lambda_2=-(R_{th}^2/C)AY$$

where the relation of $\Delta\lambda_1+\Delta\lambda_2=0$ is considered to obtain the following equation.

$$A=ZYC/R_{th}^2$$

where A corresponds to the gain of the inverting amplifier 68, so that by setting the gain of the inverting amplifier 68 so as to satisfy the above equation, an always constant wavelength can be maintained irrespective of changes in the drive current for the laser diode 2.

Figure 13:
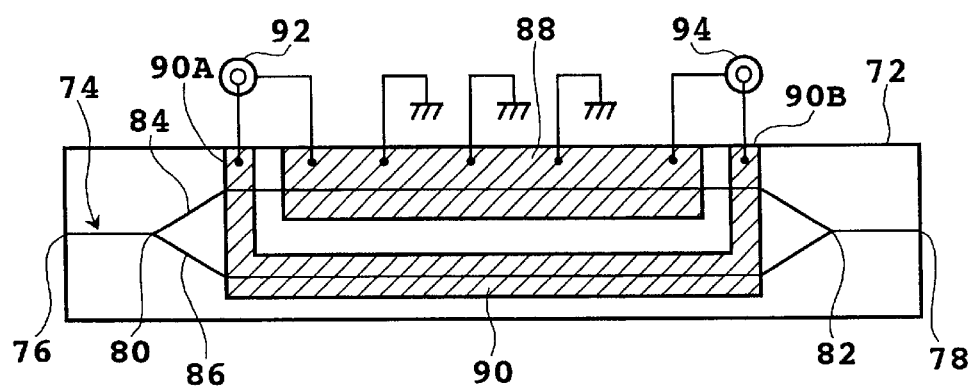
FIG. 13 is a plan view showing an LN modulator applicable to the present invention.

FIG. 13 is a plan view showing an LN modulator applicable to the present invention. This LN modulator is a Mach-Zehnder type optical modulator using LiNbO$_3$ (lithium niobate) as a substrate material. This LN modulator has an optical waveguide structure 74 provided by a dielectric chip 72. The dielectric chip 72 is formed of lithium niobate. In this case, the optical waveguide structure 74 is obtained by thermal diffusion of Ti (titanium).

The optical waveguide structure 74 has an input port 76 for receiving a light beam from a light source (not shown) and an output port 78 for outputting a modulated optical signal. The optical waveguide structure 74 further has a first Y branch 80 and a second Y branch 82 respectively optically connected to the input port 76 and the output port 78, and first and second paths 84 and 86 for connecting the Y branches 80 and 82.

The input beam supplied to the input port 76 is branched into first and second beams substantially equal in optical power to each other by the first Y branch 80. The first and second beams are guided by the paths 84 and 86, respectively, and then interfere with each other at the second Y branch 82. According to a phase difference between the first and second beams at the second Y branch 82, switching is carried out between a coupling mode where an output beam is obtained at the output port 78 and a leaky mode where a leaky beam is radiated from the second Y branch 82 into the dielectric chip 72, thereby outputting an intensity-modulated optical signal from the output port 78.

To change the phase difference between the first and second beams, a grounding electrode 88 is provided on the first path 84, and a signal electrode 90 is provided on the second path 86. The signal electrode 90 is configured as a traveling wave type such that an input end 90A is connected to an internal conductor of a connector 92 and an output end 90B is connected to an internal conductor of a connector 94. Shields of the connectors 92 and 94 and the grounding electrode 88 are grounded. The electrodes 88 and 90 are formed by vapor deposition of Au (gold), for example. Although not shown, a single or plural stabilizing buffer layers formed of Si and/or SiO$_2$ may be provided between the dielectric chip 72 and the electrodes 88 and 90.

Figure 14:
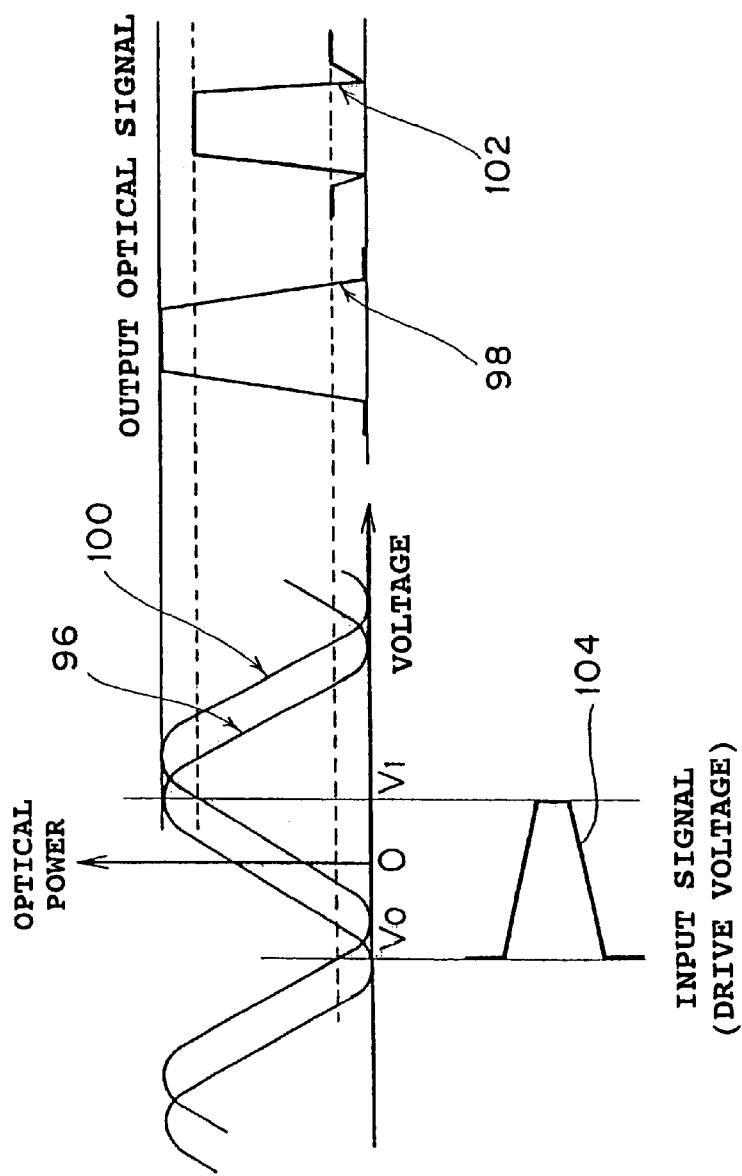
FIG. 14 is a graph for illustrating operation point drift.

Operation point drift will now be described with reference to FIG. 14. In an LN modulator, an operation characteristic curve is drifted by a temperature change or aged deterioration in general (which is referred to as operation point drift). In FIG. 14, reference numerals 96 and 98 denote an operation characteristic curve and an output optical signal waveform, respectively, in the case that no operation point drift occurs, and reference numerals 100 and 102 denote an operation characteristic curve and an output optical signal waveform, respectively, in the case that an operation point drift toward positive voltage occurs. Reference numeral 104 denotes a waveform of an input main signal or modulating signal (drive voltage).

The operation characteristic curve is represented as a periodic change in output optical power with an increase in voltage. In the example shown, the periodic change is given by a sine curve. Accordingly, by using voltages $V_0$ and $V_1$ respectively providing a minimum value and a maximum value of the optical power, respectively corresponding to the two logical values (the low level and high level) of the input signal as a binary signal to thereby perform effective switching between the leaky mode and the coupling mode mentioned above, efficient binary modulation can be performed.

When the voltages $V_0$ and $V_1$ are constant upon occurrence of the operation point drift, the extinction ratio of the output optical signal is degraded as shown by reference numeral 102 by the periodicity of the operation characteristic curve. Accordingly, when the operation point drift occurs in an amount of dV, the voltages $V_0$ and $V_1$ should be changed to ($V_0$+dV) and ($V_1$+dV), respectively, thereby compensating for the operation point drift.

Figure 15:
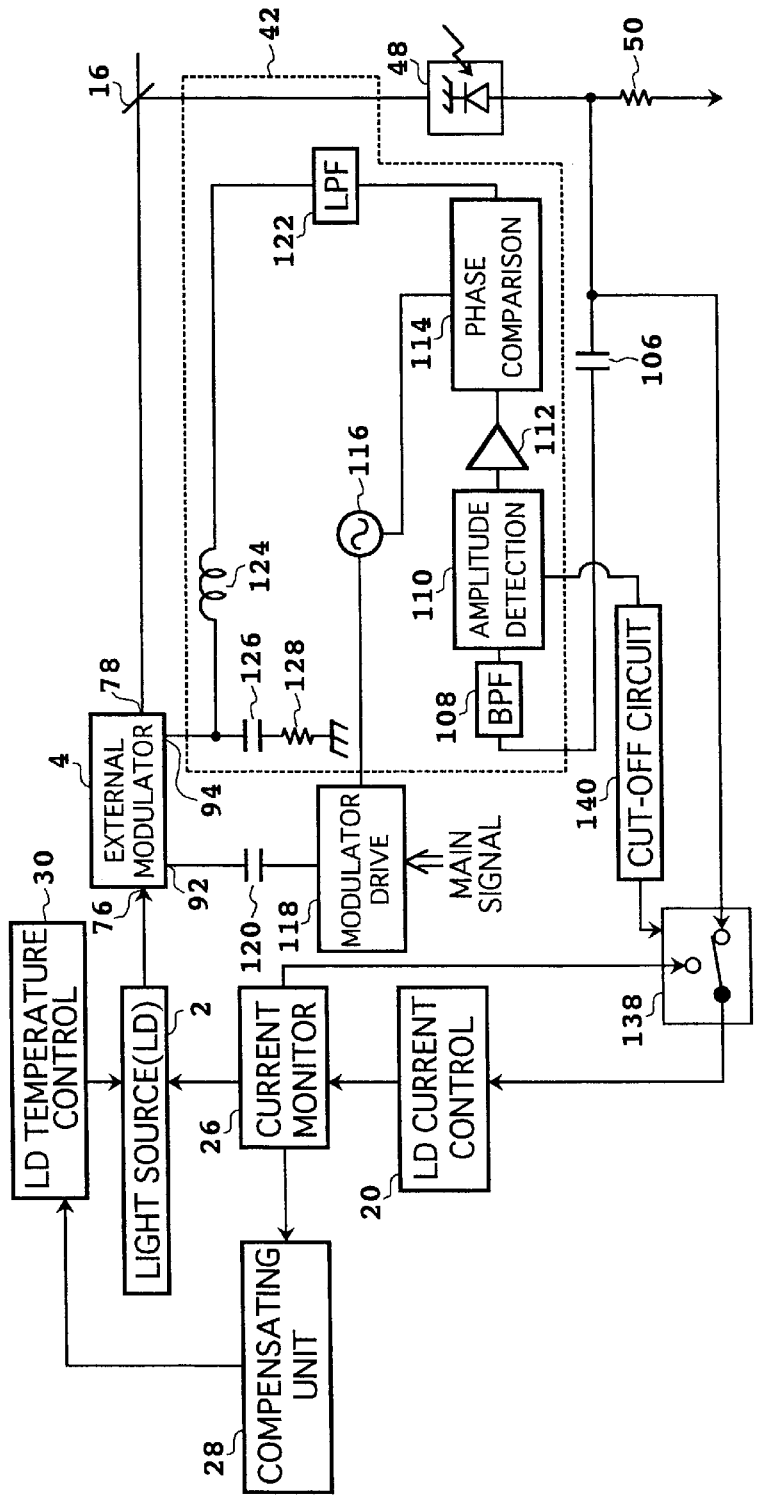
FIG. 15 is a block diagram showing an eighth preferred embodiment of the optical transmitter according to the present invention.

FIG. 15 is a block diagram showing an eighth preferred embodiment of the optical transmitter according to the present invention. This preferred embodiment corresponds to the fifth preferred embodiment shown in FIG. 9, and specific circuit configurations of the automatic bias control circuit 42, the bias monitor 44, and the switch circuit 46 are shown.

As the external modulator 4, the LN modulator shown in FIG. 13 is used. A light beam from the laser diode 2 is supplied to the input port 76 (see FIG. 13) of the external modulator 4. A part of an optical signal output from the output port 78 of the external modulator 4 is extracted by the beam splitter 16 and supplied to a photodiode 48. A photocurrent generated in the photodiode 48 is converted into a voltage signal by a resistor 50, and this voltage signal is supplied through a capacitor 106, a band-pass filter (BPF) 108, an amplitude detector circuit 110, and an amplifier 112 to a phase comparator circuit 114.

A low-frequency signal (pilot signal) output from an oscillator 116 is used for operation point stabilization. The pilot signal is supplied to the phase comparator circuit 114 and a modulator drive circuit 118. The modulator drive circuit 118 may be composed of a variable-gain amplifier for amplifying a data input signal (main signal) and a low-pass filter connected to the output of the variable-gain amplifier. In this case, the gain of the variable-gain amplifier is changed by the pilot signal, and as a result, the pilot signal is superimposed on the data input signal. By the use of the low-pass filter, the pilot signal is superimposed on both the low level and high level of the data input signal in opposite phases. A resultant signal is then supplied as a modulating signal through a capacitor 120 to the connector 92 (see FIG. 13) of the external modulator 4.

The phase comparator circuit 114 is provided by a synchronous detector circuit, for example. The phase comparator circuit 114 performs phase comparison between the low-frequency signal from the oscillator 116 and a low-frequency component included in the voltage signal from the photodiode 48. The result of this phase comparison appears in a DC component of an output signal from the phase comparator circuit 114. Then, a bias voltage for the external modulator 4 is controlled according to the DC component. More specifically, an output signal from the phase comparator circuit 114 is supplied as the bias voltage through a low-pass filter (LPF) 122 and an inductor 124 to the terminal 94 (see FIG. 13) of the external modulator 4. The terminal 94 of the external modulator 4 is grounded through a capacitor 126 and a resistor 128 for the purpose of termination with respect to the modulating signal.

Thus, the bias voltage for the external modulator 4 is feedback controlled to thereby stabilize the operation point of the external modulator 4. In this feedback loop, the bias voltage is adjusted so that the low-frequency component included in the voltage signal from the photodiode 48 is minimized.

Figure 16:
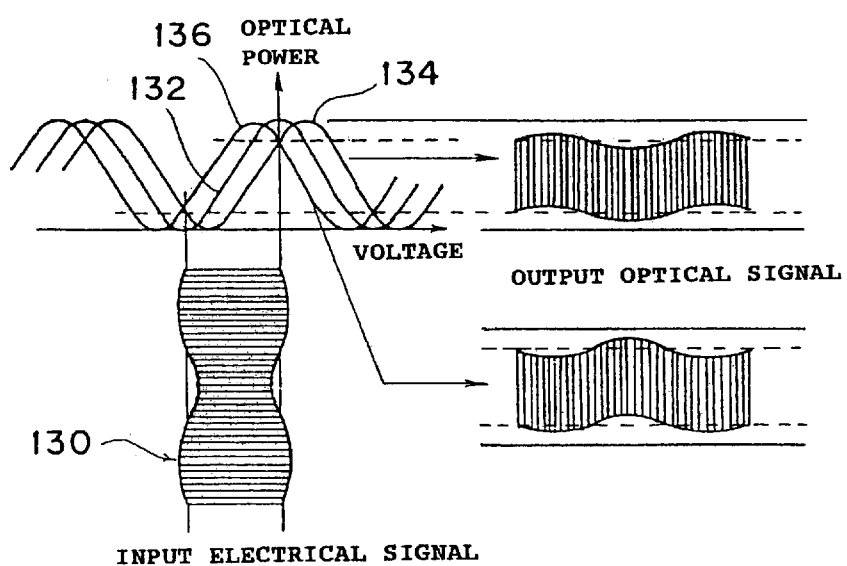
FIG. 16 is a graph for illustrating the principle of operation point stabilization.

Referring to FIG. 16, there is shown the principle of the operation point stabilization in the LN modulator shown in FIG. 15. Reference numeral 130 denotes a waveform of the input electrical signal, that is, a waveform of the modulating signal output from the modulator drive circuit 118 (see FIG. 15).

An optimum operation point is determined by an operation characteristic curve such that both levels of the input electrical signal 130 provide maximum and minimum output optical powers as shown by reference numeral 132. When the operation characteristic curve is shifted as shown by reference numeral 134 or 136 along the voltage axis because of variations in temperature or the like, a low-frequency component is generated in the output optical signal, and the direction of shifting is reflected by the phase of the low-frequency component. That is, the phases of envelopes of the output optical signals provided by the characteristic curves 134 and 136 are different 180° from each other. Accordingly, by performing synchronous detection, for example, with the phase comparator circuit 114 as shown in FIG. 15, feedback control as minimizing the low-frequency component can be performed to thereby stabilize the operation point of the external modulator 4.

In the eighth preferred embodiment shown in FIG. 15, a switch 138 is provided to switch between a first control mode where the LD current control circuit 20 controls a bias current for the laser diode 2 so that the output level of the photodiode 48 becomes constant and a second control mode where the drive current for the laser diode 2 detected by the current monitor 26 is controlled to become constant. More specifically, when the amplitude of the low-frequency component detected by the amplitude detector circuit 110 is greater than a predetermined value, a cut-off circuit 140 operates the switch 138 to select the second control mode, whereas when the amplitude of the low-frequency component detected by the amplitude detector circuit 110 becomes smaller than the predetermined value, the cut-off circuit 140 operates the switch 138 to select the first control mode.

Accordingly, contention between the control by the automatic bias control circuit 42 and the control for APC can be prevented to allow stable control.

In an optical switching device utilizing interference such as an LN modulator, prechirping can be performed by utilizing a wavelength change (chirping) substantially generated by interference. The prechirping is a method for suppressing degradation of a transmission waveform due to chromatic dispersion and nonlinear effects, by preliminarily providing a wavelength (frequency) change in one pulse of an optical signal to be transmitted.

Referring to FIG. 17A, there is shown an operating characteristic curve of an LN modulator. When a region 142 in the vicinity of one stable point Vb1 is used as an applied voltage to apply a positive voltage pulse as shown by a left-hand graph in FIG. 17B, a positive optical pulse having the same polarity as that of the voltage pulse is output as shown by a left-hand graph in FIG. 17C, because optical power (P) increases with an increase in applied voltage (V) in the region 142. At this time, the wavelength becomes shorter than an average value at a rising part of the optical pulse, and becomes longer than the average value at a falling part of the optical pulse as shown by a left-hand graph in FIG. 17D. That is, in one optical pulse the wavelength is shifted from a shorter-wavelength side (blue side) to a longer-wavelength side (red side) as time (t) proceeds. This phenomenon is referred to as red shift.

In contrast, when a region 144 in the vicinity of another stable point Vb2 is used to apply a negative voltage pulse as shown by a right-hand graph in FIG. 17B, a positive optical pulse having a polarity opposite to that of the voltage pulse is output as shown in a right-hand graph in FIG. 17C, because optical power (P) decreases with an increase in applied voltage (V) in the region 144. At this time, the wavelength is shifted to a longer-wavelength side at a rising part of the optical pulse, and is shifted to a shorter-wavelength side at a falling part of the optical pulse as shown by a right-hand graph in FIG. 17D. That is, in one optical pulse, the wavelength is shifted from a longer-wavelength side (red side) to a shorter-wavelength side (blue side) as time (t) proceeds. This phenomenon is referred to as blue shift.

A chirp parameter $\alpha$ of an optical pulse is given by:

$$\alpha = 2(d\phi/dt)/(dS/dt)/S$$

where $\phi$ is the optical phase, and S is the optical intensity.

In the case of red shift, the chirp parameter $\alpha$ takes a positive value, whereas in the case of blue shift, the chirp parameter $\alpha$ takes a negative value.

When the wavelength of an optical signal is shorter than the zero-dispersion wavelength of an optical fiber used as a transmission line, and falls in a region of normal dispersion, light of a longer wavelength travels faster than light of a shorter wavelength in the optical fiber. Accordingly, by preliminarily providing prechirping of $0<\alpha$ (red shift), pulse compression occurs to increase an eye opening.

Conversely, when the wavelength falls in a region of anomalous dispersion, light of a shorter wavelength travels faster than light of a longer wavelength in the optical fiber. Accordingly, by preliminarily providing prechirping of $\alpha<0$ (blue shift), the eye opening can be increased.

Further, by adjusting the value of the chirp parameter a in response to the conditions of the optical fiber transmission line, the transmission conditions of the whole system can be optimized.

FIG. 18 is a block diagram showing a ninth preferred embodiment of the optical transmitter according to the present invention. In contrast with the eighth preferred embodiment shown in FIG. 15, the ninth preferred embodiment is characterized in that the sign of the chirp parameter of an optical signal to be obtained can be switched. To this end, an inverter circuit 146 is provided between the oscillator 116 and the phase comparator circuit 114. The operation of the inverter circuit 146 is controlled by a signal supplied to a chirp parameter setting terminal 148. When the inverter circuit 146 is inoperative, the region 142 shown in FIG. 17A is selected to obtain a positive chirp parameter, whereas when the inverter circuit 146 is operative, the region 144 shown in FIG. 17A is selected to obtain a negative chirp parameter. The inverter circuit 146 may be provided between the modulator drive circuit 118 and the oscillator 116, or may be provided at another input of the phase comparator circuit 114.

Reference numeral 150 denotes a terminal to which a signal related to start-up (cold start) of a system is supplied. In the case that the operation point has been changed by the terminal 148 or the system has been started up by the terminal 150, the operation of the automatic bias control circuit 42 is not in a steady state, so that the bias voltage for the external modulator 4 has not yet been stabilized. Therefore, the control for APC should be stopped until the bias voltage becomes stable. To this end, a timer 152 is provided between the terminals 148 and 150 and the switch 138 in this preferred embodiment. By using the timer 152, the second control mode is selected by the switch 138 during a predetermined period of time until stabilization of the bias voltage, whereas the first control mode is selected after stabilization of the bias voltage.

As a result, contention between the control by the automatic bias control circuit 42 and the control for APC can be prevented to thereby allow stable control.

According to the present invention as described above, it is possible to provide an optical transmitter having an external modulator wherein the output power and/or wavelength of an optical signal to be output from the optical transmitter can be maintained constant with high accuracy.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical transmitter comprising:
   a laser diode outputting light as a forward beam and a backward beam;
   an external modulator modulating said light from said laser diode according to a main signal to output an optical signal;
   a power monitor detecting power of said optical signal output from said external modulator;
   a first control unit controlling a drive current for said laser diode so that the power detected by said power monitor becomes constant;
   a wavelength monitor detecting a wavelength of said backward beam;
   a second control unit controlling a temperature of said laser diode so that the wavelength detected by said wavelength monitor becomes stable;
   a current monitor detecting said drive current; and
   a compensating unit changing the temperature of said laser diode according to a change in said drive current detected by said current monitor so that the wavelength of said light beam becomes constant.

2. An optical transmitter according to claim 1, wherein said external modulator is a Mach-Zehnder type optical modulator for receiving a bias voltage determining an operation point.

3. An optical transmitter according to claim 2, further comprising an automatic bias control circuit for controlling said bias voltage so that said operation point is stabilized.

4. An optical transmitter according to claim 2, further comprising means for cutting off the operation of said first control unit until said bias voltage becomes stable.

5. An optical transmitter according to claim 1, wherein said compensating unit linearly decreases the temperature of said laser diode with an increase in said drive current.

6. An optical transmitter, comprising:
   a laser diode for outputting a light beam;
   an external modulator for modulating said light beam output from said laser diode according to a main signal to output an optical signal;
   a power monitor for detecting the power of said optical signal output from said external modulator;
   a current monitor for detecting a drive current of said laser diode;
   a first control unit for controlling said drive current so that the power detected by said power monitor becomes constant; and
   a compensating unit for changing the temperature of said laser diode according to a change in said drive current detected by said current monitor so that the wavelength of said light beam becomes constant, wherein said compensating unit linearly decreases the temperature of said laser diode with an increase in said drive current.

7. An optical transmitter, comprising:
   a laser diode outputting a light beam;
   an external modulator modulating said light beam output from said laser diode according to a main signal to output an optical signal;
   a power monitor detecting power of said optical signal output from said external modulator;
   a current monitor detecting a drive current;
   a first control unit controlling said drive current of said laser diode so that the power detected by said power monitor becomes constant; and
   a compensating unit changing the temperature of said laser diode according to a change in said drive current detected by said current monitor so that the wavelength of said light beam becomes constant, wherein said compensating unit comprises
   a storing means for storing a change in the wavelength of said light beam according to a change in said drive current, and
   means for calculating a change in the temperature of said laser diode required to compensate for the wavelength change of said light beam.

8. An optical transmitter, comprising:
   a laser diode outputting a light beam;
   an external modulator modulating said light beam output from said light source according to a main signal to output an optical signal;
   a power monitor detecting the power of said optical signal output from said external modulator, wherein said power monitor comprises a photodiode receiving a part of said optical signal, and a resistor for converting a photocurrent flowing in said photodiode into a voltage signal; and
   a first control unit controlling a drive current for said laser diode so that the power detected by said power monitor becomes constant, wherein said first control unit comprises an operational amplifier for receiving a reference voltage and said voltage signal to output an error signal, and a transistor for receiving said error signal as a control input to supply said drive current to said laser diode.

9. An optical transmitter comprising:
   a light source outputting a light beam;
   an external modulator that includes a Mach-Zehnder type optical modulator receiving a bias voltage determining an operation point for modulating said light beam output from said light source according to a main signal to output an optical signal;
   an automatic bias control circuit for controlling said bias voltage so that said operation point is stabilized, wherein said automatic bias control circuit comprises means for superimposing a low-frequency signal on said main signal, and means for controlling said bias voltage so that a low-frequency component included in said optical signal is decreased;
   a power monitor detecting the power of said optical signal output from said external modulator; and
   a first control unit controlling said light source so that the power detected by said power monitor becomes constant.

10. An optical transmitter according to claim 9, further comprising means for cutting off the operation of said first control unit until the amplitude of said low-frequency component becomes smaller than a predetermined value.

11. An optical transmitter, comprising:
    a light source for outputting a light beam;
    an external modulator that includes a Mach-Zehnder type optical modulator receiving a bias voltage determining an operation point for modulating said light beam output from said light source according to a main signal to output an optical signal;

a power monitor for detecting the power of said optical signal output from said external modulator;

a first control unit for controlling said light source so that the power detected by said power monitor becomes constant means for cutting off the operation of said first control unit until said bias voltage becomes stable, wherein said cufting-off means comprises a switch for switching between said first control unit and said automatic bias control circuit, and a timer connected to said switch.

12. An optical transmitter comprising:

a laser diode outputting a light beam;

an external modulator modulating said light beam output from said light source according to a main signal to output an optical signal;

a power monitor detecting the power of said optical signal output from said external modulator;

a current monitor detecting a drive current for said laser diode;

a first control unit controlling said drive current so that the power detected by said power monitor becomes constant; and a second control unit controlling the temperature of said laser diode to a constant value; and a compensating unit changing the temperature of said laser diode according to a change in said drive current detected by said current monitor so that the wavelength of said light beam becomes constant.

13. An optical transmitter according to claim 12, wherein said compensating unit linearly decreases the temperature of said laser diode with an increase in said drive current.

14. An optical transmitter according to claim 12, wherein said compensating unit comprises a means for storing a change in the wavelength of said light beam according to a change in said drive current, and a means for calculating a change in the temperature of said laser diode required to compensate for the wavelength change of said light beam.

* * * * *